8401X

M. W. Baldwin

Exhaust Mechanism for Steam Engines.

Patented Sep. 10, 1834.

377 8401X Sept. 10: 1834 397

Matthias W. Baldwin.

The Schedule referred to in these Letters Patent, and mak-
ing part of the same, containing a description in the words of the
said Matthias W. Baldwin, himself, of his improvement in loco-
motive engines and cars, for rail roads.

---

To all whom it may concern. Be it known, that I, Mat-
thias W. Baldwin, of the City of Philadelphia, and State of Pennsylvania,
have made certain improvements in locomotive engines and rail
road Cars, a part of which improvements are applicable to sta-
tionary steam engines: and I do hereby declare that the follow-
ing is a full and exact description thereof.

The improvements which I have made consist in a new
mode of constructing the crank of locomotive engines, and of at-
taching it to the wheels; a new mode of constructing the wheels
of locomotive engines and cars; a new mode of forming the joints
and other parts of the supply pump, and of locating the pump
itself; and a new mode of forming the joints of steam, and other
tubes; all of which improvements are fully made known in the
following description, and the drawings therein referred to,
which make a part thereof.

Figure 1:
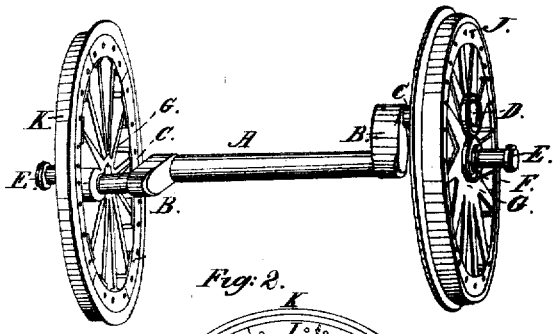

A. Fig. 1, is the shaft of the Crank, the axis of which is in
a line with the centre of the wheels. B. B, are the arms of the Crank,
and C, C, the wrists; this part is prolonged, so as to pass through the
wheels, a socket being formed therein for that purpose, as shown at
D, figs. 1, & 2, in which sockets the prolonged ends of the wrists are
firmly fastened by wedges, screws, or otherwise. E. E, are journals
fixed in the centres of the wheels, entirely independent of the crank,
and sustained by outside bearings. By this construction of the crank,
it possesses greater strength than when made with two arms to
each crank, whilst, at the same time, the shaft A, is made
proportionably longer, and a corresponding increase of width is afforded for the boiler between the arms B, B.

Figure 2:
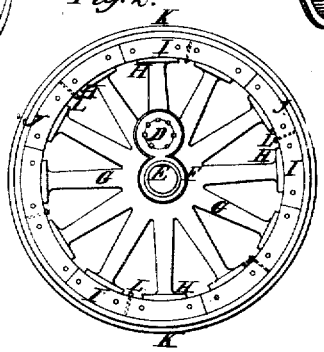

My improvement in the construction of the wheels is shown in fig. 1, & 2; but most plainly in fig. 2. E, is the end of the journal, and F the hub. G, G, are the arms or spokes, of the wheel, which are cast without rim, or hoop, but have upon their ends, in lieu thereof, segment flanches H, H, separate from each other, by which means the injurious effect of the unequal expansion of the material of which the wheel consists, is lessened, or altogether prevented. Tenons or pins I, I, project from these flanches, into openings made in the wooden felloes J, J, which forms a part of the rim of the wheel, upon this the iron rim, or tire K, is passed, and secured by bolts L, L, in the usual manner.

The wooden felloes are best made in two thicknesses, and put together so as to break joints.

Figure 3:
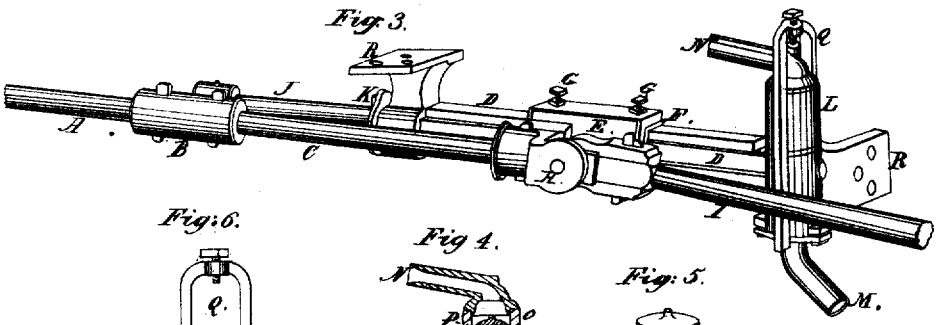
Figure 6:
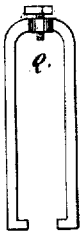
Figure 4:
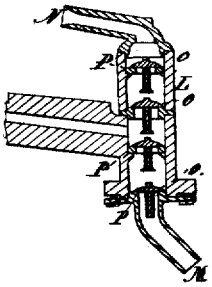
Figure 5:
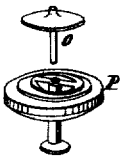

In fig. 3, the valve chamber of the supply pump, and its appendages are shown. Fig. 4, is a section of the supply pump, and its valves. Fig. 5, a valve and seat drawn on a larger scale, and fig. 6, the stirrup by which the different parts of the valve chamber are held together. In all these figures the corresponding parts are designated by the same letters. A, is the piston rod of the engine, attached by the connecting socket B, to the connecting rod C, which moves the slide E, with its box F, adjustable on the guide D, by the set screws G, which guide is hollow and forms the chamber of the pump, constituting my improvement in that part. H, is a wrist attached to the slide and carrying the pitman I. J, is the piston rod of the supply pump, the head of which is made fast to the connecting socket, B. K, is the stuffing box of the pump, which needs no description. L, is the valve chamber; M, the induction, and N, the eduction pipe, seen to more advantage in the section fig. 4. O, O, are the valves, of which I use four in the manner represented, the object of using two valves in the place of one, is to insure the required action, should one of them be accidently obstructed by the interposition of any foreign matter, the doing this, is not claimed as new, or as a feature peculiar to my valve chamber, the novelty in this part consisting in the mode of putting, and holding, the respective parts of the chamber together, so as to render the junctures perfectly tight, without the employment of packing of any kind. For this purpose the flanch on the upper end of the induction pipe M, is fitted to the chamber by turning & grinding and the same is the case with the eduction pipe N, the flanch of which forms the cap of the chamber; the chamber is also joined together near its middle, being fitted to one of the valve seats, steam tight, as shown in the drawing. The stirrup Q, fig. 4, seen in its place in fig. 3, holds all these parts together by means of the screw through its crown, and affords at the same time the means for examining and adjusting the parts without loss of time. R, R, in fig. 3, are the flanches by which the apparatus is attached in its proper place.

Figure 7:
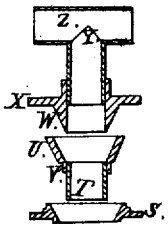

The steam tube joint, I make in the manner shown in fig. 7; it is in three parts; the flanch S, may be fastened within the boiler; the conical opening T, receives the conical part U, of a socket, to the cylindrical portion of which V, the steam, or other tube is affixed by riveting, or otherwise; the interior cone of this socket receives the cone W, and the whole of the junctures being carefully ground, are drawn together by screws passing through the flanch X. The parts are thus fitted together steam-tight without any packing, and can be separated and replaced in a very few minutes. Y, Z, Z, shows the continuation of a tube for conveying the steam to the cylinders.

What I claim as my improvement in the respective parts of locomotive engines and cars, herein described, is, first, the manner of constructing the crank, and inserting the wrist thereof, prolonged, into a socket in the wheel, or otherwise attaching it thereto, for the purpose of obtaining the advantages set forth

8401x Sept 10, 1834

Secondly. The casting the wheel with the arms, or spokes, separate from each other and attaching them to a rim, or felloes of wood by separate flanches. Thirdly, The manner of constructing the pump chamber, so as to fit it together without any packing, and to confine the respective parts in their places by means of a stirrup, operating in the manner described, and also, the forming the chamber of the pump itself within one of the guide pieces. Fourthly, The general manner of constructing and adapting the juncture of steam or other tubes, without packing as set forthe; not intending however, in either of the cases referred to, to confine myself to the precise form and construction represented in the drawings but to vary the same in any way by which I may be able to attain the same ends by analogous means.

Witnesses
Danl. B. Lippard
S. Badger

M. W. Baldwin

Drawing 1260 words

Exd. W.J.C.